Aug. 24, 1965  HIROSHI TACHIZAWA ETAL  3,202,945
CAVITY RESONATOR TUNED BY MEANS OF MAGNETICALLY CONTROLLED
COAXIAL FERRITE MATERIAL LOCATED IN AIR AUXILIARY CAVITY
Filed April 19, 1963
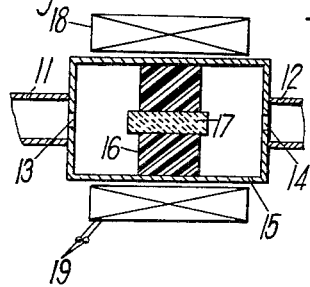
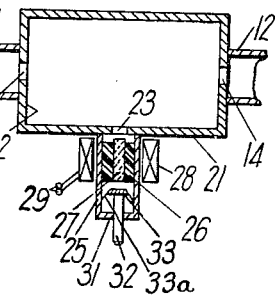
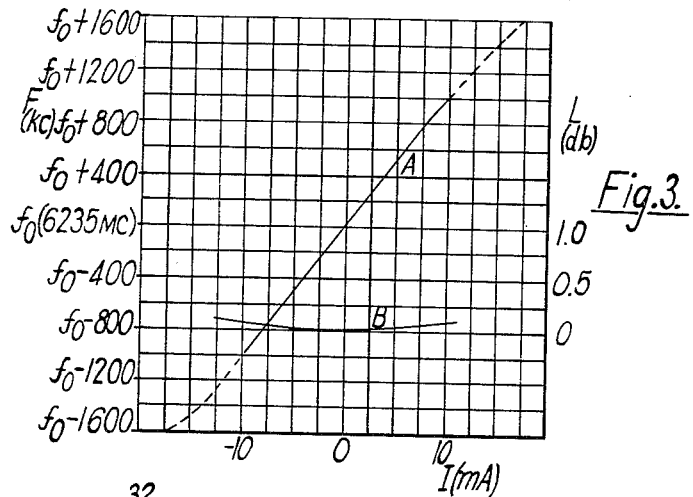
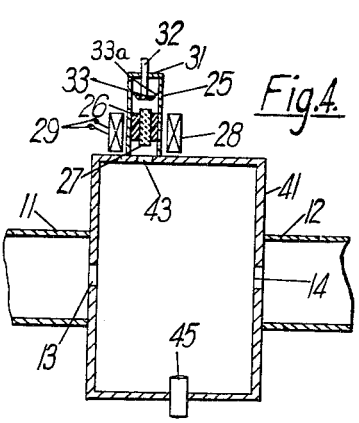
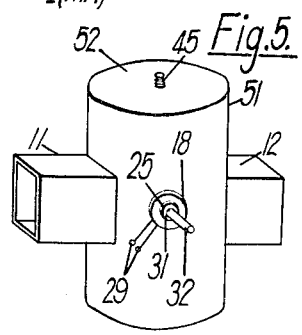
Inventors
H. TACHIZAWA -
S. KITAZUME
By 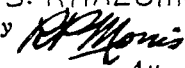
Attorney United States Patent Office 3,202,945
Patented Aug. 24, 1965

3,202,945
CAVITY RESONATOR TUNED BY MEANS OF MAGNETICALLY CONTROLLED COAXIAL FERRITE MATERIAL LOCATED IN AN AUXILIARY CAVITY
Hiroshi Tachizawa and Susumu Kitazume, Tokyo, Japan, assignors to Nippon Electric Company, Limited, Tokyo, Japan, a corporation of Japan
Filed Apr. 19, 1963, Ser. No. 274,261
Claims priority, application Japan, Apr. 25, 1962, 37/16,941
4 Claims. (Cl. 333—83)

This invention relates to a cavity resonator of variable resonance and more particularly to one which includes a body of ferromagnetic material whose magnetic permeability varies with the change in an exciting magnetic field thus altering the resonant frequency of the cavity.

Cavity resonators of this type are used as an element of an automatic frequency control (AFC) device and as the major element of variable frequency filters, frequency meters, and frequency analysers. Where it is employed as an element of an AFC device, it serves as the standard cavity resonator of the AFC oscillator which includes: a reflex klystron or the like; the standard cavity resonator of adjustable resonance connected to the oscillator; means for varying, by about one percent or less, the resonant frequency, at a rate of about 50 c./s.; means for rectifying the output of the standard cavity resonator; and means for mechanically or electrically controlling the oscillation frequency of the oscillator according to the output of the rectifying means. With this kind of AFC device, use is made of the fact that a reversal of the output phase of the rectifying means takes place depending upon whether the resonant frequency is higher or lower than the center resonant frequency. In other words, the oscillation frequency is controlled by detecting whether the output of the rectifying means is in the same or the opposite sense with respect to a standard phase.

The most preferable conventional cavity resonators comprise a cylindrical cavity, a ferrite rod of some length disposed coaxially within the cavity, and a coil wound coaxially about the cavity so as to produce an exciting magnetic field along the axis of the cavity. In this type of resonator, the magnetic permeability of the ferrite rod varies with the change in the axial magnetic field which in turn is caused by changes in the electric current flowing through the coil windings. Although an empirical formula, representing the quantitative relation between such changes in the magnetic permeability and the resonant frequency of the cavity will be given later, the qualitative interpretation of the phenomenon is as follows: the change in the magnetic permeability causes a change in the phase constant of the propagation factor for circularly polarized microwaves within the cylindrical cavity, resulting in a change in the guide wavelength and consequent change in the resonant frequency.

In a conventional cavity resonator, of the kind mentioned above, the number of windings in the coil and the electric current flowing therethrough must be large in order to produce a sufficient magnetic field along the axis of the cylindrical cavity, which is of fairly large diameter. Also, it is very difficult to prevent the resonant frequency from being affected by the thermal change in volume of the cylindrical cavity. The cylindrical cavity must therefore be made of a material of small thermal expansion coefficient, such as invar; invar however is ferromagnetic material and so makes it impossible to provide the axial magnetic field. Furthermore, the disposition of the ferrite rod in the path of the propagating microwave results not only in a considerable attenuation of the wave passing through the cylindrical cavity, but also in the appearance of a substantial amplitude-modulation component in the output wave.

Hence the object of this invention is to provide a cavity resonator of variable resonance which avoids the above-mentioned defects and effectuates the same result with a smaller exciting current and number of turns, and without the disadvantageous amplitude-modulation component in the output wave and temperature affects.

The cavity resonator of the invention comprises a cylindrical cavity having an input and an output to which are coupled an input and an output waveguide, respectively. An auxiliary cavity is window-coupled to the cylindrical cavity and a ferrite rod positioned therein substantially along the axis. A coil is disposed coaxially about the auxiliary cavity so as to produce a magnetic field for varying the magnetic permeability of the rod. Thus the ferrite rod is maintained within an auxiliary cavity which is removed from the path of the propagating microwave, and the above-mentioned defects of the conventional cavity resonator are obviated.

The above-mentioned and other features and objects of this invention and the manner of attaining them will become more apparent and the invention itself will be best understood by reference to the following description of embodiments of the invention taken in conjunction with the accompanying drawings in which:

FIG. 1 shows an axial section of a conventional variable resonance cavity resonator;

FIG. 2 illustrates an axial section of a cavity resonator according to the invention;

FIG. 3 is a graph illustrating the characteristics of the embodiment shown in FIG. 2; and FIGS. 4 and 5 are an axial section and perspective view, respectively, of alternative embodiments of the invention.

In order to lay a proper foundation for understanding the invention, a conventional cavity resonator will first be explained with reference to FIG. 1. The conventional cavity resonator comprises a cylindrical cavity 15 having at the input and the output ends coupling windows 13 and 14 connected to input and output waveguides 11 and 12, respectively. A ferrite rod 17 is supported coaxially within the cylindrical cavity by supporting means 16 of foamed polyethylene or the like. Coil 18 is disposed coaxially about the cylindrical wall of the cavity so as to produce, when energized, a magnetic field along the axis thereof. Coil terminals 19 are connected to an external power source, not shown, for energizing the coil. The magnetic permeability of the ferrite rod 17 varies in accordance with the change in the magnetic field. Thus if the terminals 19 are connected to an alternating-current power source of 50 c./s. and if an input wave is applied through the input waveguide 11, the frequency of the output wave obtained at the output waveguide 12 will vary slightly above and below the center frequency of the cavity resonator.

With this type of cavity resonator, however, the disposition of the ferrite rod (in the path of the propagating wave) effects, as has been described, considerable attenuation to the transmitted signal and consequently substantially reduces the quality factor of the resonator. Furthermore, the attenuation provided by the rod varies with its change in magnetic permeability with the result that if the frequency of the exciting current is 50 c./s. as mentioned above, the output microwave is amplitude-modulated by the 50 c./s. alternating current. In most cases the attenuation increases with an increase in the exciting current, or in the resonant frequency, which results in a substantial shift downward in the center resonant frequency. Consequently, the use of this type cavity resonator as an element of an AFC device results in a shift of the oscillation frequency towards frequencies which are lower than the desired frequency. Even if the changes in attenuation can be made to vary symmetrically with respect to the center frequency, the attenuation itself can never be avoided although the shift of the center frequency may be.

Referring now to FIG. 2, the variable resonance cavity resonator of the invention will now be explained. A cylindrical cavity 21 which has an axial length of about a half wavelength of the propagating microwave and which has, on the input and output ends, coupling windows 13 and 14, is connected through the windows to input and output waveguides 11 and 12, respectively. The cylindrical cavity is provided, adjacent a point which is spaced in the axial direction from bottom wall 22 about one-fourth a wavelength (which is the axial center point), with another coupling window 23. An auxiliary cavity 25, of cylindrical waveguide, is attached to the cylindrical wall of the cavity 21 so that its axis passes through the center point of the coupling window 23 radially of the main cylindrical cavity. The dimensions of the coupling window 23 are nearly equal to those of the cross section of ferrite rod 27.

The inside diameters of the main and auxiliary cavities are determined mainly by the operating frequency. The effective axial length of the auxiliary cavity 25 is about one-fourth of the wavelength of the propagating microwave but somewhat longer to accommodate conductor plate 31 by which the cavity is terminated and the ferrite rod 27. Within the auxiliary cavity 25 the ferrite rod 27, one-fourth a wavelength long is supported by foamed polyethylene 26 or the like so that the axis thereof may substantially coincide with that of the auxiliary cavity. A coil 28 is disposed coaxially about the auxiliary cavity terminals 29 of the coil are connected to a power source (not shown).

In order to adjust the resistance component of the impedance seen from the coupling window 23 (looking towards the auxiliary cavity) so that it may be independent of the change in the frequency, an adjustable shorting plate 33 provided with contact spring element 33a is provided within the auxiliary cavity 25. The shorting plate is provided with a threaded member 32 for adjustment. If the plate 33 is made out of ferro-magnetic conductive material, the reluctance of the magnetic circuit through which the field produced by the coil 28 passes can be reduced, with the result that the coil can be reduced further in size. Inasmuch as the conductor plate 31 can also serve as the shorting plate, shorting plate 33 can be omitted, provided no consideration need be given to reducing the magnetic reluctance with a view for further reducing the dimensions of coil 28.

If the magnetic permeability of the ferrite rod 27 is denoted by $\mu$; the center resonant frequency of the auxiliary cavity 25 by $f_0$; a constant, determined by the type of the auxiliary cavity and the mode of the input microwave by $k$; the volume occupied by the ferrite rod by $v$; and the volume of the auxiliary cavity by $V$, then the variation $df$ in the resonant frequency can be given by the following formula:

$$df/f_0 = k(\mu-1)(v/V) \qquad (1)$$

which shows that frequency variation $df$, sufficiently small as compared with the center resonance frequency $f_0$, is in linear relation with the change in the magnetic permeability $\mu$. Inasmuch as the cavity resonator of the invention does not contain a ferrite rod within the main cavity, a change in the resonant frequency does not follow the qualitative explanation given in the preamble. It will be understood, however, that a change in the resonant frequency of the auxiliary cavity (with the change in the exciting current) is equivalent to a change in the impedance seen from the coupling window 23 towards the auxiliary cavity, and that inasmuch as the impedance change occurs at a location which is spaced about one-fourth a wavelength from the bottom wall 22 containing the input side coupling window, there is an effective change to the resonant frequency of the cylindrical cavity 21.

In order to visualize the technical merits of the invention, the characteristics of the cavity resonator of FIG. 2 are shown in FIG. 3. In FIG. 3 the exciting current (in milliamperes) is plotted along the abscissa against both the resonant frequency F (in kilocycles) adjacent the center frequency $f_0$ (6235 mc.), and the attenuation L (in db) caused by the ferrite rod. The change in the resonant frequency, caused by the exciting current I, and the attenuation of the microwave, caused by the ferrite rod, are shown by curves A and B, respectively, each of which is approximately a straight line. The dimensions and materials of the cavity resonator for which the above results were obtained are as follows:

Cavity resonator 21:
  Inside diameter and axial length: 30.4 mm.; 65.6 mm.
  Axial position of the coupling window 23: center of the axial length (about one-fourth wavelength from the bottom wall 22)

Auxiliary cavity 25 (circular waveguide):
  Inside diameter and axial length: 18 mm.; 38 mm.
  Material and dimensions of the ferrite rod 27: manganese-magnesium-ferrite; 5.6 x 15 x 38 mm. (rectangular parallelepiped)
  Material of the supporting means 26: a plate of foamed polyethylene Coil 28:
  Five thousand turns of a copper wire of 0.1 mm. in diameter wound around the auxiliary cavity 25 in an axial length of 30 mm.
  Coil current: 50 c./s. alternating-current 14 ma. (R.M.S.)
  Ratio $V_1/V_2$ of the volume $V_1$ of cylindrical cavity 21 to the volume $V_2$ of auxiliary cavity 25: about 5
  Ratio $V_2/v$ of the volume $V_2$ of auxiliary cavity 25 to the volume $v$ of ferrite rod 27: about 4.1

As may be seen from the characteristic curves A and B, the cavity resonator of the invention has excellent frequency characteristics and has an insertion loss which is virtually unaffected by the frequency change.

The above-described cavity resonator is so arranged that it may be excited by a $TE_{11n}$-mode circularly polarized microwave. If the input microwave is a circularly polarized wave of $TE_{01n}$ mode, the arrangement must be modified in the manner known in the microwave art. Such modified embodiments are shown in FIGS. 4 and 5.

In the cavity resonator of FIG. 4, the coupling windows 13 and 14, connected to the input and the output waveguides 11 and 12, are disposed at opposite ends of a diameter at the center of the cylindrical wall. A coupling window 43, connected to the auxiliary cavity 25, is provided in one of the plane circular walls at a location slightly displaced along a radius from the center. The auxiliary cavity is the same as that previously discussed and is illustrated in FIGS. 4 and 5 with the same reference numerals used in FIG. 2. The wall opposite to that containing the window 43 is provided with a threaded screw 45 axially movable for fine adjustment of the resonant frequency.

In the cavity resonator of FIG. 5, the auxiliary cavity 25 is attached to the cylindrical wall so as to extend, in the plane including the axes of the input and the output waveguides 11 and 12, perpendicularly to the axes of these waveguides. The wall 52 is provided with an adjustment screw 45 similar to that in FIG. 4.

As will be appreciated from the foregoing embodiments, the cavity resonator of the invention is operable with a very small exciting current. Also, the removal of the ferrite rod from the path of the propagating wave prevents an amplitude modulation component from appearing in the output. Furthermore, the disposition of the main cavity vis-a-vis the magnetic path of the exciting magnetic field makes it possible to manufacture the main cavity of a material of low thermal expansion coefficient which may now be a magnetic material such as invar.

While the invention has thus far been explained in conjunction with some embodiments and some modifications thereof, it will be seen that other modifications are derivable. By way of example, a rectifier may be attached, instead of the output waveguide 12, directly to the wall adjacent the output-side coupling window 14, where the cavity resonator is to be used as an element of the AFC device referred to in the preamble of the specification. Furthermore, although the auxiliary cavity is preferably a circular waveguide, for facilitating the disposition of a coil therearound, it may also be a rectangular waveguide. In addition, it is not without the realm of possibility that a ferromagnetic material of excellent high frequency characteristics, superior to ferrites, may be utilized instead of the rod material designated.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. A cavity resonator of variable resonant frequency comprising a main resonant cavity, an input and output circuit for said main cavity, a coupling window formed in one wall of said main cavity, an auxiliary cavity terminated at one end thereof with a conductor plate and directly coupled at its other end to said main cavity through said coupling window, a rod-shaped body of ferromagnetic material coaxially disposed within said auxiliary cavity, and an exciting coil disposed about said auxiliary cavity for producing a coaxial field therein and varying the magnetic permeability of said body when said coil is energized.

2. A cavity resonator as claimed in claim 1 in which said auxiliary cavity comprises, at the end opposite to that which is coupled to the main cavity, a ferromagnetic conductive plate adjustably disposed within said cavity for varying the length thereof.

3. A cavity resonator as claimed in claim 1 wherein said input and output circuit each comprise a waveguide coupled to said main resonant cavity through a coupling window, and in which the axes of the coupling windows of said input and output circuit and the axis of the coupling window for said auxiliary cavity are co-planar.

4. A cavity resonator as claimed in claim 3 in which the coupling widnow for said auxiliary cavity is disposed one-quarter of a wavelength of the center resonant frequency from a plane including the coupling window for said input circuit.

References Cited by the Examiner
UNITED STATES PATENTS

| | | | |
|---|---|---|---|
| 2,402,948 | 7/46 | Carlson | 332—29 X |
| 2,588,226 | 3/52 | Fox | 333—73 |
| 2,708,222 | 5/55 | Herlin | 331—90 |
| 2,752,495 | 6/56 | Kroger | 331—90 |
| 2,870,418 | 1/59 | Hewitt | 333—73 |
| 2,944,232 | 7/60 | Beljers et al. | 333—83 X |
| 2,993,180 | 7/61 | Weiss | 333—1.1 |
| 3,114,074 | 12/63 | Buck | 315—5.53 |
| 3,118,082 | 1/64 | Brunn | 333—83 X |

HERMAN KARL SAALBACH, *Primary Examiner.*